(12) United States Patent
Nguyen et al.

(10) Patent No.: US 8,852,668 B2
(45) Date of Patent: Oct. 7, 2014

(54) IN-LINE BUBBLE REMOVAL MECHANISM

(75) Inventors: Hung T. Nguyen, San Diego, CA (US);
Scott Mueller, Escondido, CA (US);
Ronald Farnbach, Temecula, CA (US);
John Papp, Temecula, CA (US);
Matthew Gillick, Murrieta, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 607 days.

(21) Appl. No.: 13/039,192

(22) Filed: Mar. 2, 2011

(65) Prior Publication Data
US 2012/0225186 A1   Sep. 6, 2012

(51) Int. Cl.
*B01D 53/00* (2006.01)
*B05D 7/00* (2006.01)
*B05D 1/00* (2006.01)
*B05D 1/02* (2006.01)
*B01D 17/00* (2006.01)

(52) U.S. Cl.
CPC ............. *B05D 1/02* (2013.01); *B01D 17/085* (2013.01)
USPC ..... 427/2.24; 427/2.1; 427/421.1; 427/427.4; 95/46

(58) Field of Classification Search
None
See application file for complete search history.

(56) References Cited

U.S. PATENT DOCUMENTS

| | | | |
|---|---|---|---|
| 5,320,256 A * | 6/1994 | Wood | 222/212 |
| 6,248,157 B1 | 6/2001 | Sims et al. | |
| 7,144,443 B2 * | 12/2006 | Gerner et al. | 95/46 |
| 7,503,830 B2 | 3/2009 | Basol et al. | |
| 7,947,112 B1 * | 5/2011 | Gerner et al. | 95/46 |
| 2005/0279207 A1 * | 12/2005 | O'Dougherty et al. | 95/241 |
| 2006/0240178 A1 * | 10/2006 | Moein | 427/2.1 |
| 2008/0167724 A1 | 7/2008 | Ruane et al. | |
| 2009/0229465 A1 * | 9/2009 | Takahashi | 95/258 |
| 2010/0247775 A1 * | 9/2010 | Thomas et al. | 427/331 |
| 2011/0003901 A1 | 1/2011 | Pruet | |

FOREIGN PATENT DOCUMENTS

EP   598424 A2 *  5/1994
JP   2008142409 A *  6/2008

* cited by examiner

*Primary Examiner* — Cachet Sellman
(74) *Attorney, Agent, or Firm* — Squire Patton Boggs (US) LLP

(57) ABSTRACT

A mechanism for preventing or inhibiting bubbles of dissolved gasses from outgassing due to phase change phenomenon of the pressure differential inside a liquid-filled incompressible line can be provided. This mechanism may be useful in a variety of applications, such as coating of stents and scaffolds.

12 Claims, 5 Drawing Sheets

IN-LINE BUBBLE REMOVAL MECHANISM

BACKGROUND

1. Field

A mechanism for preventing or inhibiting bubbles of dissolved gasses from outgassing due to phase change phenomenon of the pressure differential inside a liquid-filled incompressible line can be provided. This mechanism may be useful in a variety of applications, such as coating of stents and scaffolds.

2. Description of the Related Art

Pumps such as positive displacement pumps (for example, Ivek™ pumps) and syringe pumps may experience bubbles from dissolved gasses outgassing due to phase change phenomenon of the pressure differential inside a liquid-filled incompressible line.

Bubbles can cause inconsistency in weight gain of stents (or scaffolds) from stent to stent in a stent-spraying operation, in which the formulated coating solution is pumped to a nozzle and then sprayed onto the stents. Such bubbles may occur when delivering a liquid-based formulation, such as an acetone-based formulation.

Inconsistency in weight gain of stents, scaffolds, or other implantable or non-implantable medical devices can lead to unpredictability in therapeutic treatments or experimentation. Moreover, inconsistency in weight gain of such devices can signal a lack of uniformity in the depth of coatings. The lack of uniformity in depth of coatings may likewise lead to inconsistencies in drug or other active pharmaceutical agents release profile, holes in layers of coatings, poor adhesion, and/or exposed underlying layers.

Accordingly a system or method is needed to remove dissolved gasses from the mobile phase of a solution source, and to improve the reliability and the consistency of a pump in depositing a stent coating.

SUMMARY

In certain embodiments, the present invention provides an apparatus including a source comprising a solution. The apparatus also includes a degasser operatively coupled to the source. The degasser may be a system comprised of a vacuum apparatus and a semi-permeable tube. The vacuum apparatus can be manipulated to have a pre-set vacuum pressure. The semi-permeable tube can have pre-determined pore size small enough to allow dissolved gas to escape on concentration gradient, yet prevent large molecules from exiting. The apparatus further includes a pump operably connected to the degasser. The apparatus additionally includes a nozzle operably connected to the pump. The degasser is configured to supply the solution, after degassing the solution, to the pump. The pump is configured to supply the solution under pressure to the nozzle. The nozzle is configured to atomize the solution and direct the solution toward a stent or scaffold.

In another embodiment, a method includes supplying a solution to a degasser. The method further includes degassing the solution in the degasser. The method additionally includes supplying the solution, degassed, to a pump. The method also includes pumping the solution to a nozzle. The method further includes atomizing the solution in the nozzle. The method additionally includes directing the solution, atomized, onto a stent or scaffold.

In a further embodiment, an apparatus includes supplying means for supplying a solution to degassing means. The apparatus further includes the degassing means for degassing the solution. The apparatus additionally includes supplying means for supplying the solution, degassed, to pumping means. The apparatus also includes the pumping means for pumping the solution to dispersion means. The apparatus also includes the dispersion means for atomizing the solution in the nozzle and for directing the solution, atomized, onto a stent or scaffold.

A method, according to certain embodiments, includes inhibiting outgassing of dissolved gases due to phase change phenomenon of a pressure differential inside a liquid-filled incompressible line. The line supplies an atomizer configured to coat a stent with the liquid in the liquid-filled incompressible line.

In certain embodiments, an apparatus includes inhibiting means for inhibiting outgassing of dissolved gases due to phase change phenomenon of a pressure differential inside a liquid-filled incompressible line. The apparatus also includes atomizing means for atomizing the liquid, supplied by the line, and for coating a stent with the liquid.

In an embodiment, an apparatus includes a source comprising a solution and a pump operably connected to the source. The apparatus also includes a check valve unit, back pressure unit, or degasser operatively coupled to the pump. The apparatus further includes a nozzle operably connected to the check valve unit, the back pressure unit, or the degasser. The pump is configured to supply the solution, under pressure, to the check valve unit, the back pressure unit, or the degasser. The check valve unit, the back pressure unit, or the degasser is configured to supply the solution under pressure to the nozzle. The nozzle is configured to atomize the solution and direct the solution toward a stent or scaffold.

A method, in certain embodiments, includes supplying a solution to a pump. The method also includes pumping the solution to a check valve unit, back pressure unit, or degasser and removing gas from the solution in the check valve unit, the back pressure unit, or the degasser. The method further includes supplying the solution from the check valve unit, the back pressure unit, or the degasser to the nozzle. The method additionally includes atomizing the solution in the nozzle. The method also includes directing the solution, atomized, onto a stent or scaffold.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
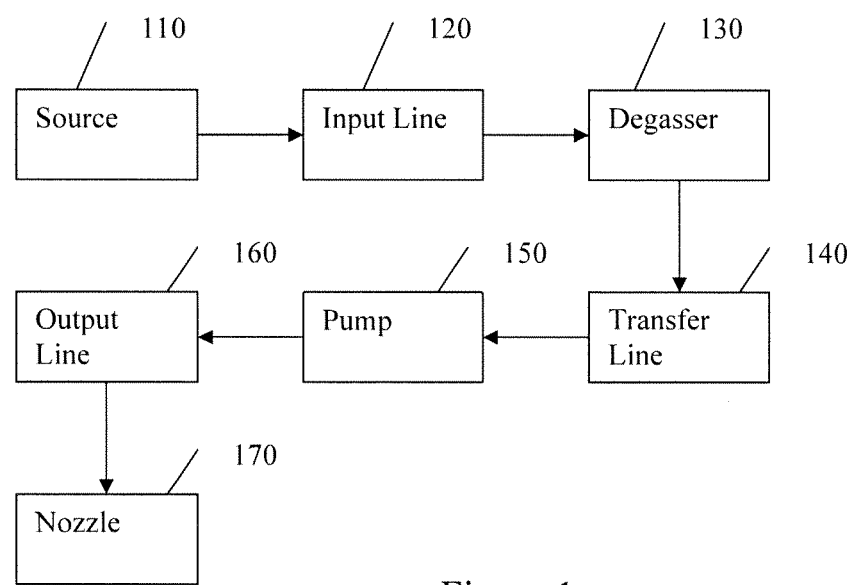
FIG. 1 illustrates an apparatus according to certain embodiments of the present invention.

Certain embodiments of the present invention provide a mechanism to prevent bubbles from occurring in a fluid line when delivering a fluid, such as a drug-polymer solution. The fluid may be delivered to a spray nozzle and onto a stent or a scaffold or other implantable medical devices such as a balloon of a catheter, a graft, or a stent graft, as well as non-implantable devices.

Thus, certain embodiments may help to make weight gain in stent coating operations more consistent. Weight gain on the stent or scaffold is one measure of the success of a coating of the stent or scaffold (for ease of reference, references to "stent" herein should be understood to be references to stents or scaffolds, unless stated otherwise). The fluid delivered to the stent may be a solution or coating composition. The solution can include, for example, a solvent and a polymer, or a solvent and a drug, or a solvent and both a polymer and a drug. Some solvents are highly volatile. Such solvents include acetone.

Acetone is one example of a solvent and of a highly volatile solvent, but other solvents, including water, may be used. As used herein, a highly volatile solvent refers to any solvent having a boiling point up to about 70 degrees centigrade. Examples of highly volatile solvents include, without limitation, tetrahydrofuran (66 degrees C.), methanol (65 degrees C.), chloroform (61 degrees C.), acetone (56 degrees C.), dichloromethane (40 degrees C.), and diethylether (35 degrees C.).

"Solvent" is defined as a liquid substance or composition that is compatible with the polymer or drug (or both, the term "or" is used inclusively herein) and is capable of dissolving the polymer or drug at the concentration desired in the composition. Examples of solvents include, but are not limited to, dimethylsulfoxide (DMSO), chloroform, acetone (as already mentioned above), water (buffered saline), xylene, methanol, ethanol, 1-propanol, tetrahydrofuran, 1-butanone, dimethylformamide, dimethylacetamide, cyclohexanone, ethyl acetate, methylethylketone, propylene glycol monomethylether, isopropanol, isopropanol admixed with water, N-methyl pyrrolidinone, toluene, and combinations thereof.

As noted above, acetone is an example of a relatively volatile solvent, meaning that acetone can change phase relatively quickly when used with polymer. Acetone can be used as a solvent in a number of solutions, including solutions that include only a polymer and a solvent, and those that include a drug, a polymer, and a solvent. An example of such solutions include everolimus+poly-DL-lactide (PDLLA)+acetone. In this example, everolimus is the drug, PDLLA is the polymer, and acetone is the solvent. In another example, the solution can have zotarolimus instead of everolimus as the drug, and thus can be zotarolimus+PDLLA+acetone.

One or more solvents can be used with one or more polymers, and one or more drugs. The drug does not have to be dissolved in the solution, but—for example—the drug can be suspended in a solution of polymer and solvent. Indeed, the drug can be in the form of a microsphere, nanosphere, or other micro- or nano-particle.

Many drugs, including therapeutic agents and bioactive agents can be used in accordance with embodiments of the present invention. A therapeutic agent can include any substance capable of exerting a therapeutic or prophylactic effect. Examples of therapeutic agents include antiproliferative substances such as actinomycin D, or derivatives and analogs thereof (manufactured by Sigma-Aldrich 1001 West Saint Paul Avenue, Milwaukee, Wis. 53233; or COSMEGEN available from Merck). Synonyms of actinomycin D include dactinomycin, actinomycin IV, actinomycin I1, actinomycin X1, and actinomycin C1. A bioactive agent can also fall under the genus of antineoplastic, anti-inflammatory, antiplatelet, anticoagulant, antifibrin, antithrombin, antimitotic, antibiotic, antiallergic and antioxidant substances. Examples of such antineoplastics and/or antimitotics include paclitaxel, (e.g., TAXOL® by Bristol-Myers Squibb Co., Stamford, Conn.), docetaxel (e.g., Taxotere®, from Aventis S. A., Frankfurt, Germany), methotrexate, azathioprine, vincristine, vinblastine, fluorouracil, doxorubicin hydrochloride (e.g., Adriamycin® from Pharmacia & Upjohn, Peapack N.J.), and mitomycin (e.g., Mutamycin® from Bristol-Myers Squibb Co., Stamford, Conn.). Examples of such antiplatelets, anticoagulants, antifibrin, and antithrombins include aspirin, sodium heparin, low molecular weight heparins, heparinoids, hirudin, argatroban, forskolin, vapiprost, prostacyclin and prostacyclin analogues, dextran, D-phe-pro-arg-chloromethylketone (synthetic antithrombin), dipyridamole, glycoprotein IIb/IIIa platelet membrane receptor antagonist antibody, recombinant hirudin, and thrombin inhibitors such as Angiomax ä (Biogen, Inc., Cambridge, Mass.). Examples of such cytostatic or antiproliferative agents include angiopeptin, angiotensin converting enzyme inhibitors such as captopril (e.g., Capoten® and Capozide® from Bristol-Myers Squibb Co., Stamford, Conn.), cilazapril or lisinopril (e.g., Prinivil® and Prinzide® from Merck & Co., Inc., Whitehouse Station, N.J.), calcium channel blockers (such as nifedipine), colchicine, proteins, peptides, fibroblast growth factor (FGF) antagonists, fish oil (omega 3-fatty acid), histamine antagonists, lovastatin (an inhibitor of HMG-CoA reductase, a cholesterol lowering drug, brand name Mevacor® from Merck & Co., Inc., Whitehouse Station, N.J.), monoclonal antibodies (such as those specific for Platelet-Derived Growth Factor (PDGF) receptors), nitroprusside, phosphodiesterase inhibitors, prostaglandin inhibitors, suramin, serotonin blockers, steroids, thioprotease inhibitors, triazolopyrimidine (a PDGF antagonist), and nitric oxide. An example of an antiallergic agent is permirolast potassium. Other therapeutic substances or agents which may be appropriate agents include cisplatin, insulin sensitizers, receptor tyrosine kinase inhibitors, carboplatin, alpha-interferon, genetically engineered epithelial cells, steroidal anti-inflammatory agents, non-steroidal anti-inflammatory agents, antivirals, anticancer drugs, anticoagulant agents, free radical scavengers, estradiol, antibiotics, nitric oxide donors, super oxide dismutases, super oxide dismutases mimics, 4-amino-2,2,6,6-tetramethylpiperidine-1-oxyl (4-amino-TEMPO), tacrolimus, dexamethasone, ABT-578, clobetasol, cytostatic agents, prodrugs thereof, co-drugs thereof, and a combination thereof. Other therapeutic substances or agents may include rapamycin and structural derivatives or functional analogs thereof, 40-O-(2-hydroxy)ethyl-rapamycin (everolimus), 40-O-(3-hydroxy)propyl-rapamycin, 40-O-[2-(2-hydroxy)ethoxy]ethyl-rapamycin, and 40-O-tetrazole-rapamycin. Other therapeutic agents, such as radioactive or radiopaque agents may also be used.

Moreover, in accordance with one embodiment, the solution may be a coating composition that can include a solvent and a polymer dissolved in the solvent and optionally a wetting fluid. The composition can also include active agents, radiopaque elements, or radioactive isotopes, as explained above.

A variety of polymers can be used. The polymer or polymers can be selected based on a variety of criteria. For example, a polymer can be selected based on its ability to form a layer on a stent, such as a balloon expandable or self-expanding stent.

The polymers in an agent layer (polymers that are combined with an agent or drug) and polymers in a primer layer or a topcoat layer (a layer that does not include a therapeutic agent or drug) can be biostable, bioabsorbable, biodegradable, or bioerodable. Biostable refers to polymers that are not biodegradable. The terms biodegradable, bioabsorbable, and bioerodable are used interchangeably and refer to polymers that are capable of being completely degraded and/or eroded when exposed to bodily fluids such as blood and can be gradually resorbed, absorbed, and/or eliminated by the body.

The processes of breaking down and eventual absorption and elimination of the polymer can be caused by, for example, hydrolysis, metabolic processes, bulk or surface erosion, heat, mechanical, and the like.

Representative examples of polymers that may be used as a substrate of a stent or coating for a stent, or more generally, implantable medical devices include, but are not limited to, poly(N-acetylglucosamine) (Chitin), Chitosan, poly(3-hydroxyvalerate), poly(lactide-co-glycolide), poly(3-hydroxybutyrate), poly(4-hydroxybutyrate), poly(3-hydroxybutyrate-co-3-hydroxyvalerate), polyorthoester, polyanhydride, poly(glycolic acid), poly(glycolide), poly(L-lactic acid), poly(L-lactide), poly(D,L-lactic acid), poly(D,L-lactide), poly(L-lactide-co-D,L-lactide), poly(caprolactone), poly(L-lactide-co-caprolactone), poly(D,L-lactide-co-caprolactone), poly(glycolide-co-caprolactone), poly(trimethylene carbonate), polyester amide, poly(glycolic acid-co-trimethylene carbonate), co-poly(ether-esters) (e.g. PEO/PLA), polyphosphazenes, biomolecules (such as fibrin, fibrinogen, cellulose, starch, collagen and hyaluronic acid), polyurethanes, silicones, polyesters, polyolefins, polyisobutylene and ethylene-alphaolefin copolymers, acrylic polymers and copolymers, vinyl halide polymers and copolymers (such as polyvinyl chloride), polyvinyl ethers (such as polyvinyl methyl ether), polyvinylidene halides (such as polyvinylidene chloride), polyacrylonitrile, polyvinyl ketones, polyvinyl aromatics (such as polystyrene), polyvinyl esters (such as polyvinyl acetate), acrylonitrile-styrene copolymers, acrylonitrile butadiene styrene (ABS) resins, polyamides (such as Nylon 66 and polycaprolactam), polycarbonates, polyoxymethylenes, polyimides, polyethers, polyurethanes, rayon, rayon-triacetate, cellulose acetate, cellulose butyrate, cellulose acetate butyrate, cellophane, cellulose nitrate, cellulose propionate, cellulose ethers, and carboxymethyl cellulose. Additional representative examples of polymers that may be especially well suited for use in fabricating embodiments of implantable medical devices disclosed herein include ethylene vinyl alcohol copolymer (commonly known by the generic name EVOH or by the trade name EVAL), poly(butyl methacrylate), poly(vinylidene fluoride-co-hexafluoropropene) (e.g., SOLEF 21508, available from Solvay Solexis PVDF, Thorofare, N.J.), polyvinylidene fluoride (otherwise known as KYNAR, available from ATOFINA Chemicals, Philadelphia, Pa., or Kynar 2750, available from Arkema), ethylene-vinyl acetate copolymers, poly(vinyl acetate), styrene-isobutylene-styrene triblock copolymers, and polyethylene glycol.

It may be very difficult to measure the weight gain due to acetone alone, because the rate of evaporation of acetone is high. In other words, the fast evaporation of acetone makes accurate weight measurements of the initial transfer of acetone to the stent difficult.

When acetone and polymer are present, weight gain can be measured after the polymer is deposited onto the stent. Prior to weighing, some time may be permitted to pass during which the acetone completes its evaporation. Indeed, in addition to merely letting time pass, the acetone may be actively dried from the stent. Once the acetone has evaporated the stent is weighed and the new weight is compared to the initial weight to determine weight gain.

When a drug, polymer, and acetone are used, weight gain can be measured after the polymer and drug have been applied and the acetone has been dried. The weight gain can be measured by comparing the pre-spray weight and the post-spray weight. Another alternative is to bake the stent before weighing it. Thus, the comparison would be between a pre-spray weight and a post-bake weight.

Various equipment can be used to spray a coating onto a stent. For example, a system and method for coating a medical device, such as described in U.S. Patent Application Publication No. 2011/0039013 of Papp et al. ("Papp") can be used. Alternatively, a table top sprayer can be configured to spray or otherwise coat solution onto a rotating stent. Intermittently, the sprayer can spray and permit the stent to dry. This process can be automated, such that minimal operator contact is used. A pump, such as an Ivek™ pump, of the table top sprayer can deliver a displaced volume of solution to the nozzle.

Another pump, such as a Harvard pump, can be a syringe infusion pump capable of low to moderate back pressures. The dispensing of a preset volume can be controlled by a custom-designed system controller. The preset volume can be, for example, from 0.5 µl to 50 or 60 ml. The pump can deliver in a mode selected from multiple modes, such as a continuous mode, or a specific amount mode. With micro-stepping pump profiles, a Harvard pump may be able to deliver very smooth and consistent flow, virtually pulse free.

Other arrangements may involve more complex and automated operations than a relatively simple table top sprayer. Thus, the discussed embodiments should be understood simply as examples.

FIG. 1 illustrates a system according to certain embodiments of the present invention. As shown in FIG. 1, the system includes a source 110. The source 110 can be a bottle or other container of solution. The container does not need to be pressurized, but may be sealed to avoid contamination. The source 110 can be treated as a reservoir that is able to supply a solution of polymer, drug, and solvent. Other solutions are also possible (e.g. only polymer and solvent or only drug and solvent). The solvent may be a volatile solvent, such as acetone.

The source 110 may be operatively connected to an input line 120. The input line 120 can be connected, for example, to an output port of the source 110. The connection between the input line 120 and the source 110 can be a direct connection or an indirect connection, such as via a valve or the like. The input line 120 can be ⅛ inch (diameter) ethylene tetrafluoroethylene (ETFE) tubing. The size of the input line 120 can be varied, such as by increasing the diameter to ½ inch or reducing the diameter to 1/16 inch. This is one example of possible tubing. Other plastic, glass, or metal tubing may also be employed. One characteristic of ETFE is its high corrosion resistance and chemical resistance, which may be useful when the purity of the solution is important. Another characteristic of ETFE is its transparency, which may be useful in determining whether solution is flowing through the input line 120. These features, however, are optional.

The input line 120 may be a single, continuous tube or channel, or the input line 120 may be made up of more than one such tube or channel connected together. Valves or other devices may be inserted along the input line 120. In general, the input 120 can function to convey solution, also referred to in this context as eluent even though it is not only the solvent that is passing through, from the source to a degasser 130.

The input line 120 may be operably connected to the degasser 130. The connection may be direct or indirect, like the connection between the source 110 and the input line 120. In certain instances, the input line 120 may be very short or omitted, with the source being connected directly to the degasser 130.

The degasser 130 can be a 1/16 inch (diameter) semi-permeable tube. The size of degasser 130 can be varied, such as by increasing the diameter to ¼ inch or reducing the diameter to 1/32 inch. The solution may contain some amount of dissolved gas. While the solution is passing through the semi-permeable tube, at least some of the gas from the solution may pass through a wall of the semi-permeable line. Thus, the solution may be degassed. It is not necessary that absolutely all dissolved gas be removed. Additionally, other degassing techniques can employed rather than a semi-permeable line. For example, degassing may be performed on the solution in the source 110 or prior to the solution being provided to the source 110.

The semi-permeable tube can be encapsulated by a vacuum chamber. The vacuum pressure can be 5-10 inches of mercury (Hg) or can be automatically adjusted. The vacuum pressure can induce gas atoms or molecules within the solvent to pass through the semi-permeable membrane. However, the membrane may be selected to be of a pore size such that larger polymer, solvent, and drug molecules cannot readily pass through the semi-permeable membrane.

The degasser 130 can be provided with a transfer tube 140. The transfer tube 140 can be a 1/16 inch (diameter) ETFE tube. The size of transfer tube 140 can be varied, such as by increasing the diameter to 1/4 inch or reducing the diameter to 1/32 inch. Other dimensions and materials of this tube are also possible, as with the input tube 120. Like the input tube 120, the transfer tube 140 can be one or more tubes or channels connected in various ways, such as by joints or valves.

The transfer tube 140 can serve to convey degassed solution from the degasser 130 to a pump 150. In certain embodiments, the transfer tube 140 may be omitted and the degasser 130 may be directly connected to an input port of the pump 150.

The pump 150 can be a volume displacement pump. Other types of pumps are also permitted. The pump 150 can be configured to draw the solution from the source 110, through the input tube 120, degasser 130, and transfer tube 140. The pump 150 may also be configured to supply the solution under pressure to a nozzle 170, optionally via an output line 160.

The output tube 160 can be another 1/16 inch (diameter) ETFE tube. The size of transfer line 160 can be varied, such as by increasing the diameter to 1/4 inch or reducing the diameter to 1/32 inch. As with the other tubes in the system, the output tube 160 can be variously implemented. It should be noted that the 1/16 inch (diameter) reference is a reference to the external diameter of the tube. The internal diameter may 0.020 inches. The internal diameter of the 1/8 inch (diameter) tube may be 1/16 inches.

The output tube 160 can be operably connected to nozzle 170. Nozzle 170 can be any suitable atomization nozzle, such as an internal atomization nozzle or an external atomization nozzle. The nozzle can project the solution in atomized form onto a stent.

In an alternative embodiment, the degasser 130 may be placed downstream from the pump 150 rather than upstream from the pump 150, as shown in FIG. 1. In this alternative embodiment, delivery of the solution to the nozzle may be more difficult to control.

The use of certain embodiments of the present invention may have various effects. For example, use of certain embodiments of the present invention can remove dissolved gases from the mobile phase and improve the reliability and consistency of the pump. Certain embodiments of the present invention can minimize pressure fluctuations in the fluid tube.

Figure 2:
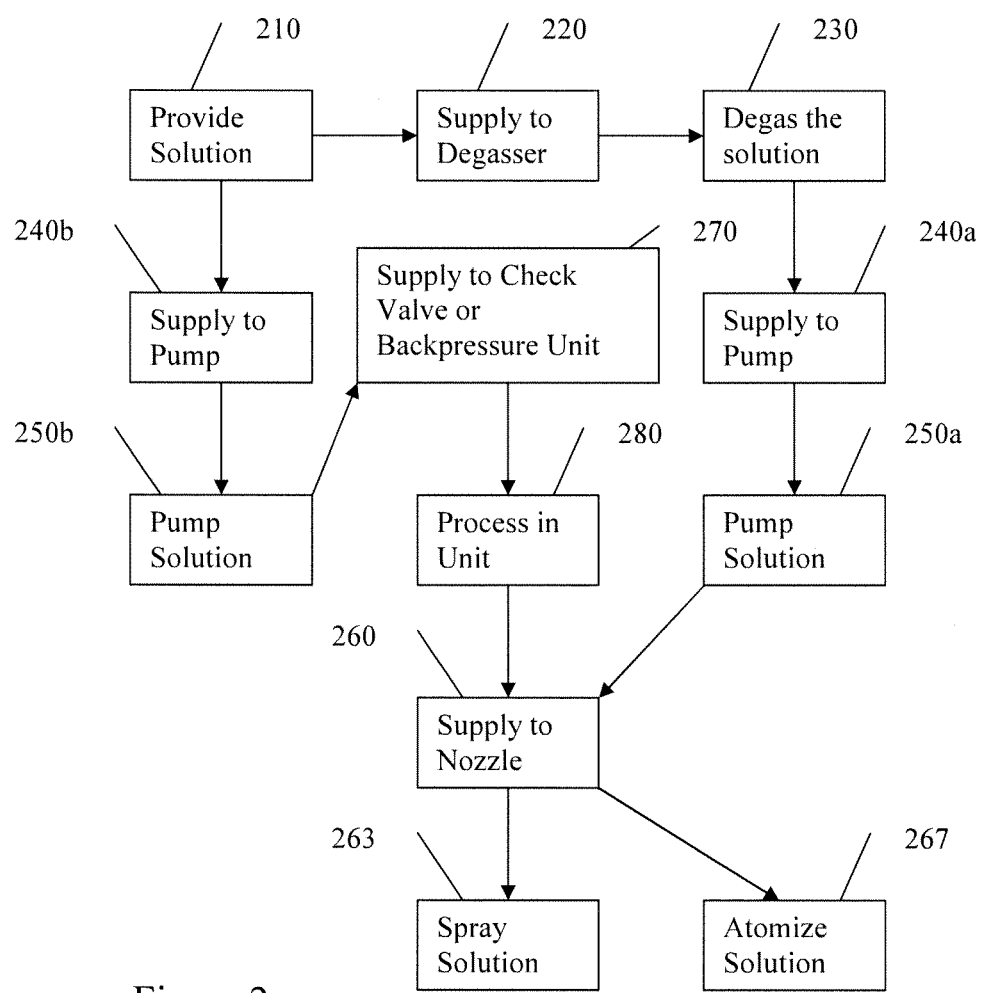
FIG. 2 illustrates methods according to certain embodiments of the present invention.

FIG. 2 illustrates a method according to certain embodiments of the present invention. As shown in FIG. 2, at 210, solution can be provided in a reservoir. The solution can include a volatile solvent, drug, and polymer. There can also be an initial amount of dissolved gas dissolved in the solvent.

Next proceeding along a clockwise alternative path, at 220, the solution can be supplied to a degasser. A 1/8 inch diameter plastic tube, such as has been discussed above, can be used. Then, at 230, the solution can be degassed. The degassing the solution can include passing the solution through a semi-permeable tube. The degassing can also include encapsulating the semi-permeable tube in a vacuum chamber and pulling a vacuum from the semi-permeable tube. The initially dissolved gas can be removed to a large extent by this mechanism. A large extent can be determined by determining whether bubbles form downstream of the degasser. If no bubbles form in 50 cycles, then the gas has been substantially removed.

Subsequently, at 240a, the degassed solution can be supplied to a pump, which can be, for example, a positive displacement pump, such as a pump manufactured by Ivek™. A 1/16 inch diameter plastic tube can be used to supply the degassed solution to the pump. The pump can, at 250a, pump the solution toward a nozzle. The cycles of the pump can serve as the cycles for measuring whether gas has been substantially removed.

At 260, the pressurized liquid can be supplied to a nozzle using, for example, a 1/16 inch diameter plastic tube. The nozzle can, at 263, spray the solution onto a stent or scaffold. The method can also include, at 267, atomizing, in the nozzle, using an external atomizer or an internal atomizer. The steps of this process can be varied. For example, the degassing can take place after providing the solution to the pump.

Proceeding from 210 in a counter-clockwise alternative path, rather than supplying the solution to a degasser, at 240b, the solution can be supplied to a pump. Then the pump can, at 250b, pump the solution. The solution can then, at 270, be supplied to a check valve or back pressure unit. Alternatively, a degasser could be used instead of the check valve or back pressure unit. Then, at 280, the check valve unit or back pressure unit can process the solution. Subsequently, at 260, the solution can be supplied to a nozzle, and the method can proceed as in the clockwise alternative described above.

Figure 3:
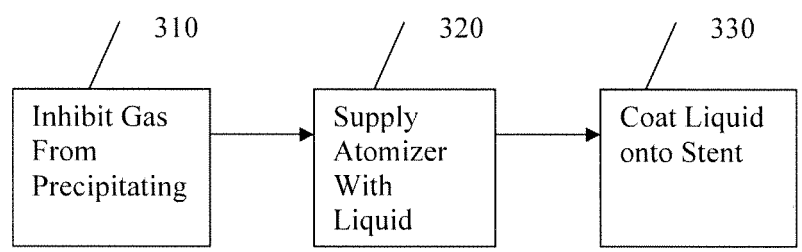
FIG. 3 illustrates another method according to certain embodiments of the present invention.

FIG. 3 illustrates another method according to certain embodiments of the present invention. At 310, the method includes inhibiting outgassing of dissolved gases due to phase change phenomenon of a pressure differential inside a liquid-filled incompressible tube. The method also includes, at 320, supplying (by the tube) an atomizer configured to coat a stent with the liquid in the liquid-filled incompressible tube. The method further includes, at 330, coating a stent with the liquid.

Figure 4:
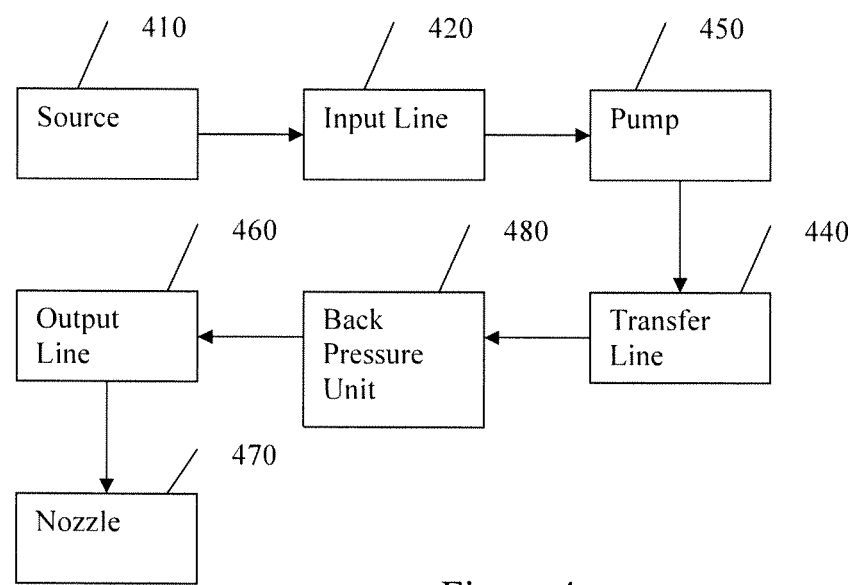
FIG. 4 illustrates an apparatus according to certain embodiments of the present invention.

FIG. 4 illustrates another apparatus according to certain embodiments of the present invention. As illustrated in FIG. 4, a source 410 can be connected to a pump 450 via an input tube 420. The source 410 can be a reservoir of solvent with polymer and/or drug. The input tube 420 can be, for example, 1/8 inch ETFE tubing. The pump 450 can be a positive displacement pump. It should be noted that in this embodiment, removal of gas occurs downstream from the pump. Accordingly, the pump itself and the tube prior to the pump may be less significant. A transfer tube 440 can transfer pressurized fluid from the pump 450 to a back pressure unit 480. The back pressure unit 480 can be a device that regulates the back pressure of a fluid system. A simple backpressure system such as a butterfly valve, or a more complex piston system can be used for this regulation of back pressure. Other back pressure systems can also be used. The transfer tube 440 can be made of, for example, 1/16 inch tubing.

The back pressure unit 480 can supply a nozzle 470 with pressurized fluid via an output tube 460. The output tube 460 can be similar to the transfer tube 440, and can be made of 1/16 inch tubing. The nozzle 470 can be an external atomization nozzle.

Figure 5:
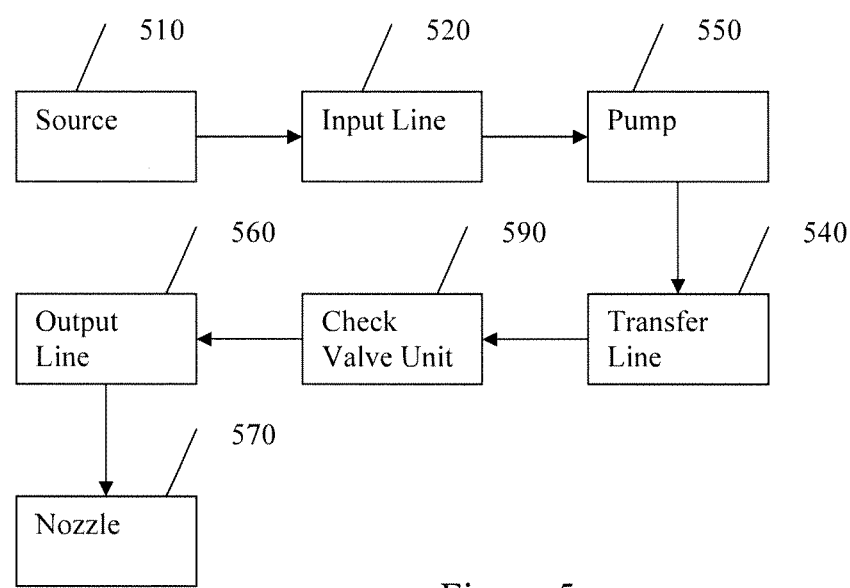
FIG. 5 illustrates another apparatus according to certain embodiments of the present invention.

FIG. 5 illustrates another apparatus according to certain embodiments of the present invention. As illustrated in FIG. 5, a source 510 can be connected to a pump 550 via an input tube 520. The source 510 can be a reservoir of solvent with polymer and/or drug. The input tube 520 can be, for example, 1/8 inch ETFE tubing. The pump 550 can be a positive displacement pump. It should be noted that in this embodiment, removal of gas occurs downstream from the pump. Accordingly, the pump itself and the tube prior to the pump may be less significant. A transfer tube 540 can transfer pressurized fluid from the pump 550 to a check valve unit 590. The transfer tube 540 can be made of, for example, 1/6 inch tubing.

The check valve unit 590 can supply a nozzle 570 with pressurized fluid via an output line 560. The check valve unit 590 can be a mechanical device that is designed to allow fluid to flow through it in only one direction. Examples of check valves include a ball check valve or a duckbill valve, but check valves of greater complexity can also be used. The output tube 560 can be similar to the transfer tube 540, and can be made of 1/16 inch tubing. The nozzle 570 can be an external atomization nozzle.

One having ordinary skill in the art will readily understand that the invention as discussed above may be practiced with steps in a different order, and/or with hardware elements in configurations which are different than those which are disclosed. For example, rather than an atomizing nozzle, a different applicator may be used, such as a brush applicator. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of coating an implantable medical device, comprising:
    supplying a solution to a pump;
    pumping the solution to a check valve unit or back pressure unit;
    removing gas from the solution in the check valve unit or the backpressure unit;
    supplying the solution from the check valve unit or the back pressure unit to a nozzle;
    atomizing the solution in the nozzle; and
    directing the solution, atomized, onto an implantable medical device.

2. The method of claim 1, wherein the supplying the solution to the pump comprises supplying the solution from a reservoir containing a volatile solvent with (a) a polymer and/or (b) a drug.

3. The method of claim 2, wherein the supplying the solution from the reservoir comprises supplying the solution via a plastic tube having a diameter in the range from 1/16 inch to 1/2 inch.

4. The method claim 1, wherein the removing the gas from the solution in the check valve unit comprises passing the solution through a ball check or duckbill valve.

5. The method of claim 1, wherein pressurized solution is transferred from the pump to the check valve unit or back pressure unit through a transfer tube.

6. The method of claim 1, wherein pumping the solution comprises pumping using a positive displacement pump.

7. The method of claim 1, wherein the supplying the solution to the nozzle comprises supplying the solution via a plastic tube having a diameter in the range from 1/32 inch to 1/4 inch.

8. The method of claim 1, further comprising:
    atomizing, in the nozzle, using an external atomizer.

9. The method of claim 1, wherein the solution comprises a volatile solvent, drug, and polymer.

10. The method of claim 1, wherein the implantable medical device comprises a stent and/or a balloon of a catheter assembly.

11. The method of claim 1, wherein
    the solution is pumped to a check valve unit, and
    the gas is removed from the solution in the check valve unit.

12. The method of claim 1, wherein
    the solution is pumped to a back pressure unit, and
    the gas is removed from the solution in the back pressure unit.

* * * * *